(12) United States Patent
Sewell et al.

(10) Patent No.: US 9,944,055 B2
(45) Date of Patent: Apr. 17, 2018

(54) THERMO-COMPRESSION BONDING TOOL WITH HIGH TEMPERATURE ELASTIC ELEMENT

(71) Applicant: SUNPOWER CORPORATION, San Jose, CA (US)

(72) Inventors: Richard Hamilton Sewell, Los Altos, CA (US); Thomas Pass, San Jose, CA (US)

(73) Assignee: SunPower Corporation, San Jose, CA (US)

( * ) Notice: Subject to any disclaimer, the term of this patent is extended or adjusted under 35 U.S.C. 154(b) by 241 days.

(21) Appl. No.: 14/752,744

(22) Filed: Jun. 26, 2015

(65) Prior Publication Data

US 2016/0375665 A1    Dec. 29, 2016

(51) Int. Cl.
| | |
|---|---|
| *B32B 37/00* | (2006.01) |
| *B32B 37/10* | (2006.01) |
| *B30B 3/00* | (2006.01) |
| *B30B 15/34* | (2006.01) |
| *B32B 37/06* | (2006.01) |
| *B32B 37/14* | (2006.01) |
| *B32B 37/22* | (2006.01) |

(Continued)

(52) U.S. Cl.
CPC .......... *B32B 37/0053* (2013.01); *B30B 3/005* (2013.01); *B30B 15/34* (2013.01); *B32B 37/10* (2013.01); *B32B 37/0015* (2013.01); *B32B 37/06* (2013.01); *B32B 37/14* (2013.01); *B32B 37/22* (2013.01); *B32B 38/18* (2013.01); *B32B 38/1875* (2013.01); *B32B 2457/12* (2013.01)

(58) Field of Classification Search
CPC ..... B32B 37/0053; B32B 37/06; B32B 37/10; B32B 37/14; B32B 37/0015; B32B 38/18; B32B 38/1875; B32B 2457/12; B32B 37/22; B30B 15/34; B30B 3/005
See application file for complete search history.

(56) References Cited

U.S. PATENT DOCUMENTS

| | | |
|---|---|---|
| 2005/0014345 A1 | 1/2005 | Miyamoto et al. |
| 2007/0026641 A1 | 2/2007 | Ametani |

(Continued)

FOREIGN PATENT DOCUMENTS

| | | |
|---|---|---|
| DE | 10020412 | 11/2001 |

OTHER PUBLICATIONS

International Search Report and Written Opinion for PCT Patent Application No. PCT/US16/39109 dated Oct. 5, 2016, 12 pgs.

(Continued)

*Primary Examiner* — Vishal I Patel
(74) *Attorney, Agent, or Firm* — Schwabe, Williamson & Wyatt, P.C.

(57) ABSTRACT

A thermo-compression bonding tool with a high temperature elastic element, and methods of bonding a metal sheet to a substrate using a thermo-compression bonding tool are described. In an example, a system for bonding a metal sheet to a substrate includes a stage to support the substrate and an elastic roller located above the stage. The elastic roller includes a high temperature material. The system also includes a heated backing plate located above the elastic roller. The backing plate is configured to apply pressure and heat to the elastic roller as the elastic roller rolls across a metal sheet disposed above the substrate.

16 Claims, 12 Drawing Sheets

(51) Int. Cl.
 *B32B 38/18* (2006.01)
 *B32B 38/00* (2006.01)

(56) References Cited

U.S. PATENT DOCUMENTS

| | | |
|---|---|---|
| 2008/0216887 A1 | 9/2008 | Hacke et al. |
| 2009/0071588 A1* | 3/2009 | Kimura .................. C03C 27/06 156/64 |
| 2009/0209069 A1 | 8/2009 | Hirakata et al. |
| 2012/0204938 A1 | 8/2012 | Hacke et al. |
| 2014/0273335 A1 | 9/2014 | Abushama |

OTHER PUBLICATIONS

International Preliminary Report on Patentability from PCT/US2016/039109 dated Jan. 4, 2018, 9 pgs.

* cited by examiner

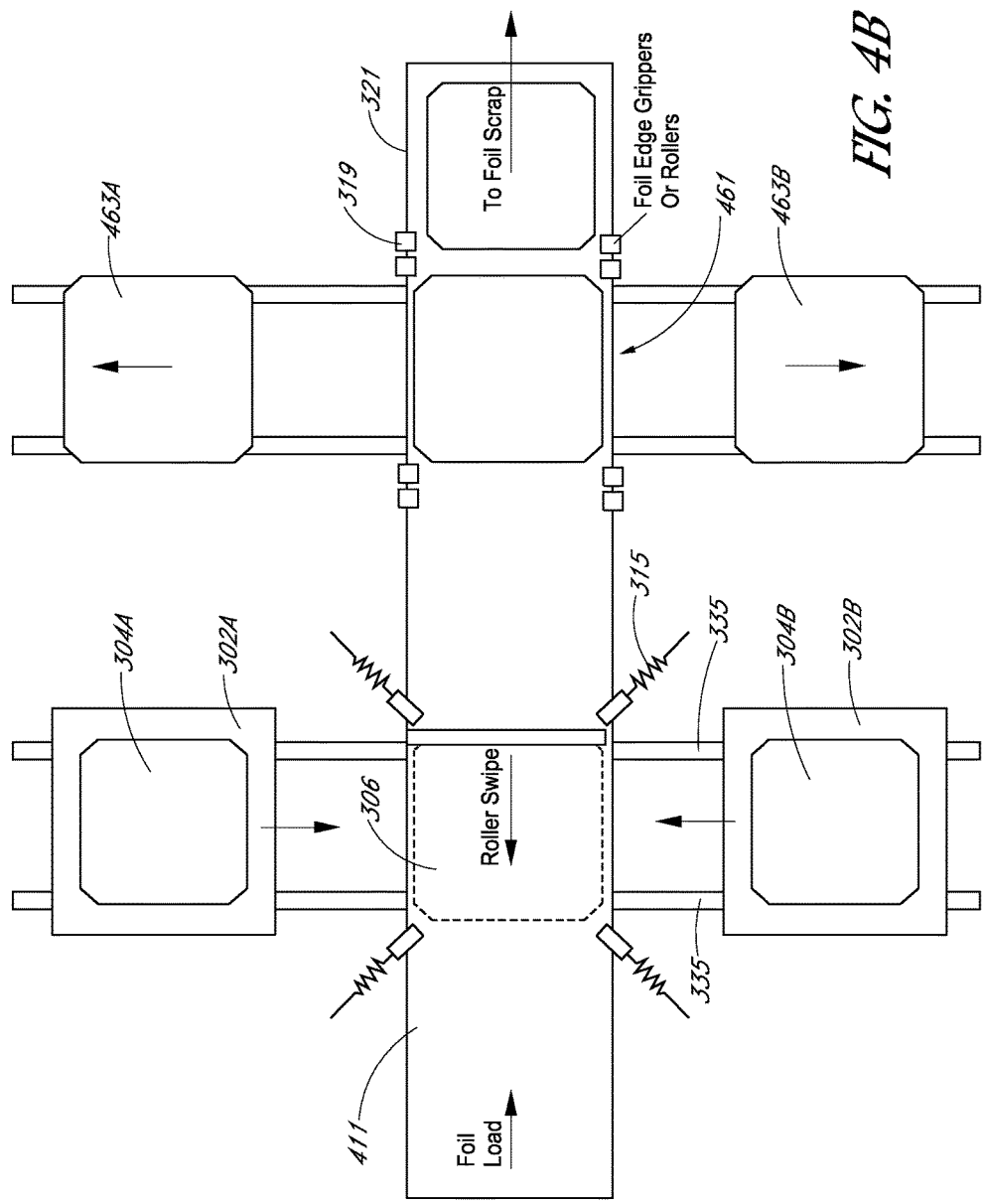

THERMO-COMPRESSION BONDING TOOL WITH HIGH TEMPERATURE ELASTIC ELEMENT

TECHNICAL FIELD

Embodiments of the present disclosure are in the field of renewable energy and, in particular, include a thermo-compression bonding tool with a high temperature elastic element.

BACKGROUND

Photovoltaic cells, commonly known as solar cells, are well known devices for direct conversion of solar radiation into electrical energy. Generally, solar cells are fabricated on a semiconductor wafer or substrate using semiconductor processing techniques to form a p-n junction near a surface of the substrate. Solar radiation impinging on the surface of, and entering into, the substrate creates electron and hole pairs in the bulk of the substrate. The electron and hole pairs migrate to p-doped and n-doped regions in the substrate, thereby generating a voltage differential between the doped regions. The doped regions are connected to conductive regions on the solar cell to direct an electrical current from the cell to an external circuit coupled thereto.

Efficiency is an important characteristic of a solar cell as it is directly related to the capability of the solar cell to generate power. Likewise, efficiency in producing solar cells is directly related to the cost effectiveness of such solar cells. Accordingly, techniques for increasing the efficiency of solar cells, or techniques for increasing the efficiency in the manufacture of solar cells, are generally desirable. Some embodiments of the present disclosure allow for increased solar cell manufacture efficiency by providing novel processes for fabricating solar cell structures. Some embodiments of the present disclosure allow for increased solar cell efficiency by providing novel solar cell structures.

BRIEF DESCRIPTION OF THE DRAWINGS

FIGS. 4A and 4B illustrate top-down views of the system of FIGS. 3A and 3B, in accordance with an embodiment of the present disclosure.

DETAILED DESCRIPTION

Figure 1A:
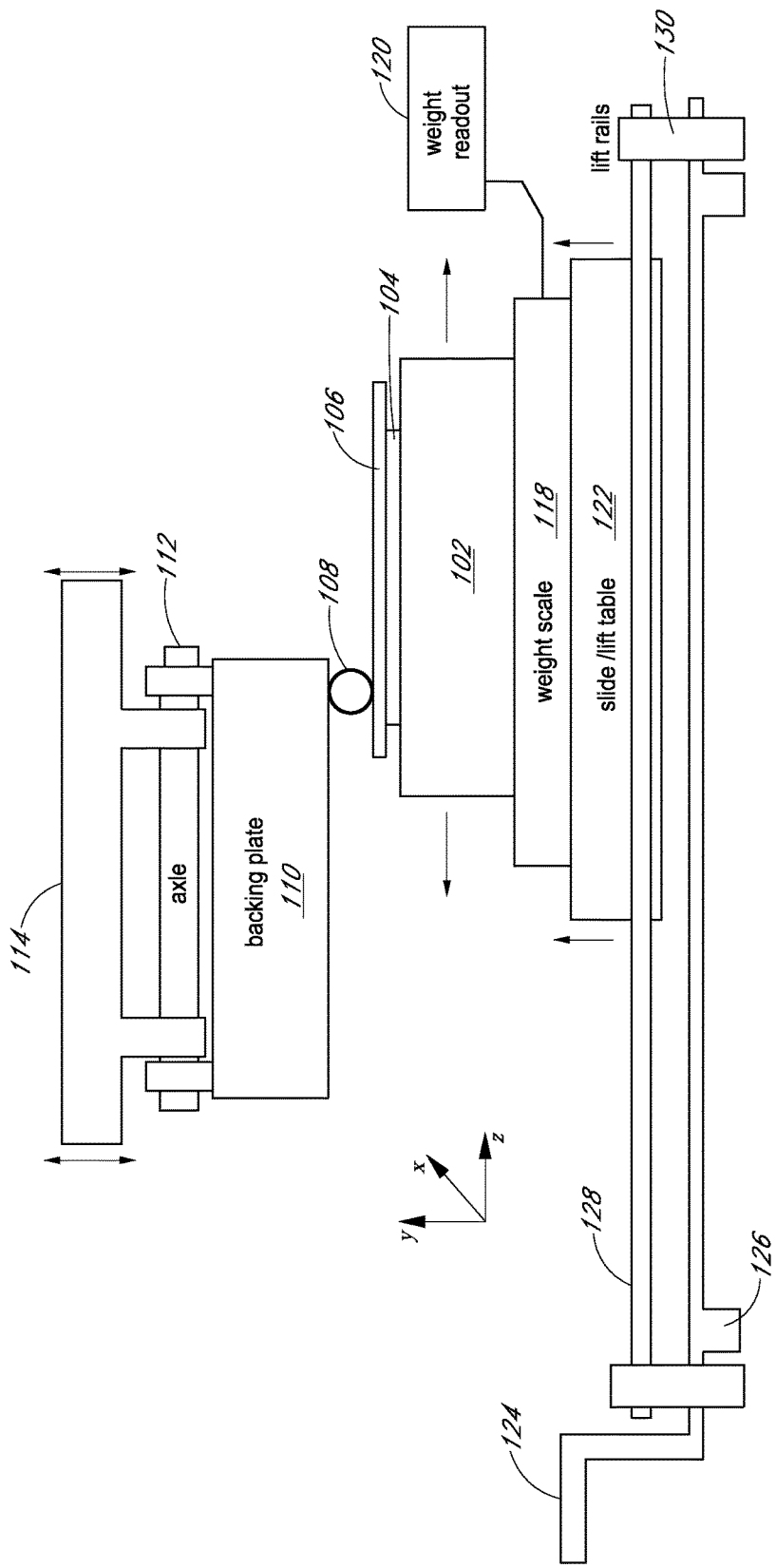
FIG. 1A illustrates a cross-sectional view of a system for bonding a metal sheet to a substrate, in accordance with an embodiment of the present disclosure.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology. The following paragraphs provide definitions and/or context for terms found in this disclosure (including the appended claims):

"Comprising." This term is open-ended. As used in the appended claims, this term does not foreclose additional structure or steps.

"Configured To." Various units or components may be described or claimed as "configured to" perform a task or tasks. In such contexts, "configured to" is used to connote structure by indicating that the units/components include structure that performs those task or tasks during operation. As such, the unit/component can be said to be configured to perform the task even when the specified unit/component is not currently operational (e.g., is not on/active). Reciting that a unit/circuit/component is "configured to" perform one or more tasks is expressly intended not to invoke 35 U.S.C. § 112, sixth paragraph, for that unit/component.

"First," "Second," etc. As used herein, these terms are used as labels for nouns that they precede, and do not imply any type of ordering (e.g., spatial, temporal, logical, etc.). For example, reference to a "first" solar cell does not necessarily imply that this solar cell is the first solar cell in a sequence; instead the term "first" is used to differentiate this solar cell from another solar cell (e.g., a "second" solar cell).

"Coupled"—The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically.

"Inhibit"—As used herein, inhibit is used to describe a reducing or minimizing effect. When a component or feature is described as inhibiting an action, motion, or condition it may completely prevent the result or outcome or future state completely. Additionally, "inhibit" can also refer to a reduction or lessening of the outcome, performance, and/or effect which might otherwise occur. Accordingly, when a component, element, or feature is referred to as inhibiting a result or state, it need not completely prevent or eliminate the result or state.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import.

Thermo-compression bonding tools with a high temperature elastic element, and methods of bonding a metal sheet to a substrate are described herein. In the following description, numerous specific details are set forth, such as specific process flow operations, in order to provide a thorough understanding of embodiments of the present disclosure. It will be apparent to one skilled in the art that embodiments of the present disclosure may be practiced without these specific details. In other instances, well-known mechanisms, such as lift cams, are not described in detail in order to not unnecessarily obscure embodiments of the present disclosure. Furthermore, it is to be understood that the various embodiments shown in the figures are illustrative representations and are not necessarily drawn to scale.

Disclosed herein are systems for bonding a metal sheet to a substrate. In one embodiment, a system includes a stage to support the substrate and an elastic roller located above the stage. The elastic roller comprises a high temperature material. The system also includes a heated backing plate located above the elastic roller. The heated backing plate is configured to apply pressure and heat to the elastic roller as the elastic roller rolls across a metal sheet disposed above the substrate.

In another embodiment, a system for bonding a metal sheet to a substrate includes a stage to support the substrate and an elastic roller located above the stage. The system also includes a pivotable backing plate located above the elastic roller. The backing plate is configured to apply pressure to the elastic roller and pivot about a line substantially perpendicular to the roller as the elastic roller rolls across a metal sheet disposed above the substrate.

Also disclosed herein are methods of bonding a metal sheet to a substrate. In one embodiment, a method involves positioning a metal sheet over the substrate. The method involves rolling an elastic roller across the metal sheet. The elastic roller includes a high temperature material. The method further involves applying pressure and heat to the elastic roller with a heated backing plate located over the roller as the elastic roller rolls across the metal sheet.

In another embodiment, a method of bonding a metal sheet to a substrate includes positioning a metal sheet over the substrate. The method involves rolling an elastic roller across the metal sheet. The method further involves applying pressure to the elastic roller with a pivoting backing plate as the elastic roller rolls across the metal sheet. The pivoting backing plate pivots about a line substantially perpendicular to the roller while applying pressure to the elastic roller.

Thus, one or more embodiments described herein are directed to thermo-compression bonding tool with a high temperature elastic element, and methods of bonding a metal sheet to a substrate.

To provide context, some thermocompression bonding techniques result in non-uniform bonds if there is any unevenness on the equipment or the items being bonded. For example, some systems employ rollers that have little or no compliance along the length of the roller, which can result in non-uniform bonds. Attempts to bond using a rigid roller supported at the ends typically results in significant bowing of the roller at the center of the wafer, resulting in low pressure and poor bonding. Additionally, roller presses typically cannot operate at high temperatures.

Embodiments include a system (e.g., a tool) design for thermo-compression bonding. In one embodiment, the system uses heat and pressure to bond an aluminum foil to a substrate, where the foil can then be patterned to form a current extraction grid for a solar cell. According to embodiments, the system can achieve uniform bond pressure across the entire substrate at high temperatures by using an elastic work roller with a backing plate that is pivoting and/or heated. For example, FIG. 1 illustrates a cross-sectional view of a system for bonding a metal sheet to a substrate, in accordance with an embodiment of the present disclosure.

As illustrated in FIG. 1A, the system includes a stage (e.g., a wafer chuck) 102 to support a substrate 104, in accordance with an embodiment. According to embodiments, the stage 102 is made from material(s) that limit or prevent adherence of foil or other materials to the stage 102. According to one embodiment, the stage 102 is made, at least in part, from graphite. A graphite stage (as opposed to, for example, a steel stage) can prevent breakage of the substrate 104 when pressure is applied by the elastic roller 108, in accordance with embodiments. However, the stage 102 may be made from additional and/or different materials (e.g., materials that have properties to limit or prevent breakage of the substrate when under pressure, and/or materials that have properties to limit or prevent adherence of foil or other materials to the stage 102). In one such embodiment, the stage 102 has a smooth surface without vacuum holes, although other embodiments may include vacuum holes in the stage 102. The stage 102 may also include one or more heating elements to heat the substrate 104, to facilitate bonding of the metal sheet 106. The substrate 104 may include various layers of materials which are either semiconducting, conducting, or insulating, over which a metal layer is to be formed to form a solar cell. According to an embodiment, the metal layer is formed, at least in part, with a metal sheet 106 that is to be bonded to a surface of the substrate 104. In one embodiment, the metal sheet 106 may be aluminum (e.g., an aluminum sheet/aluminum foil), copper, silver, composites, or any other metal appropriate for forming conductive contacts for solar cells.

In one embodiment, an elastic roller 108 is located above the stage 102. As is explained below in more detail, the elastic roller 108 is rolled across the metal sheet 106 as pressure is applied to the elastic roller 108 by a backing plate 110, in accordance with embodiments. In the embodiment illustrated in FIG. 1A, the elastic roller is coupled with the backing plate 110, which is coupled with an upper frame 114. In one embodiment, the elastic roller 108 may be held in position relative to a backing plate 110 via a wire through the elastic roller 108 and attached to the backing plate 110. However, other embodiments may hold the elastic roller 108 in place via other mechanisms, such as a rail system to hold the roller perpendicular to the edges of the substrate 104. For example, in one embodiment, a bushing (e.g., a bushing made from graphite, bronze, or another suitable material) around the outside of the elastic roller 108, and a rail system constrains the elastic roller 108 to stay perpendicular to the roll direction of the elastic roller 108.

In contrast to the embodiment illustrated in FIG. 1A, which includes a backing plate 110, some systems may include a backup roller. For example, some systems may include a backup roller, which is a second roller that applies pressure to the work roller to cause the work roller to contact a workpiece. A backup roller is typically coupled with a work roller in a fixed configuration, and the backup roller rotates as the work roller rolls across a work piece. Due at least in part to the rotation of the backup roller, a backup roller can be difficult to heat evenly. Additionally, when using a backup roller, the work roller is generally rigidly constrained to lie in the same vertical plane as the backup roller. Rigidly constraining the work roller typically involves using bearings on the work roller, which can present challenges for using an elastic roller.

In contrast, systems employing a backup plate (as illustrated in FIG. 1A) do not require rigid constraint of the elastic roller 108 to keep the elastic roller 108 in place under the backing plate 110, in accordance with embodiments. As mentioned above, a retaining wire through the roller (or other non-rigid constraint mechanism) can be sufficient to hold the elastic roller 108 up against the backing plate 110. Additionally, in systems employing a backing plate 110, lateral forces on the elastic roller 108 are typically much smaller than when using a backup roller, and friction can prevent the elastic roller 108 from being pushed out of the system. In embodiments, the elastic roller 108 can self-align to the substrate 104 because of the ability of the backing plate 110 to pivot. Furthermore, a backing plate is typically easier to heat than a backup roller.

Turning again to FIG. 1A, the backing plate 110 is to apply pressure to the elastic roller 108 as the elastic roller 108 rolls across a metal sheet 106 disposed above the substrate 104, in accordance with embodiments. As illustrated in FIG. 1A, in one embodiment, the backing plate remains relatively fixed in the xz-plane, and moves vertically along the y-axis to apply the desired pressure to the elastic roller 108. For example, in one embodiment, the backing plate 110 applies pressure in a range of 20 kgF to 100 kgF (1.5 N/mm to 7.9 N/mm). However, other embodiments may involve applying pressure that is less than 20 kgF or greater than 100 kgF. In one embodiment, the substrate could be nested in the stage, or surrounded by a frame over the stage 102, such that the elastic roller 108 can continue applying substantially the same pressure at the edges of the substrate and the interior of the substrate. According to embodiments, nesting or framing the substrate 104 can help support the elastic roller 108 at the edges of the substrate 104, and therefore protect the edges of the substrate 104 as the elastic roller 108 reaches and/or passes over the edges of the substrate 104.

The backing plate 110 may be heated, in which case the backing plate 110 can apply heat as well as pressure to the elastic roller 108 as the elastic roller 108 rolls across the metal sheet 106, according to embodiments. For example, in one embodiment, the backing plate 110 is heated to a temperature in a range of 300 to 550° C. via one or more heating elements. Heating elements may be embedded or external to the backing plate 110. The backing plate 110 may be made from steel (such as grade 316 steel, or another suitable grade of steel), or another material that is capable of being heated and applying pressure to the elastic roller 108. The stage 102 may also, or alternatively, be heated via one or more heating elements. For example, in one embodiment, the stage 102 is heated to a temperature in a range of 300-550° C. According to one embodiment, the pressure and the heat from the backing plate 110, which is transmitted through the elastic roller 108 to the metal sheet 106, causes the metal sheet 106 to become bonded to a surface of the substrate 104.

An "elastic roller" is a roller that has at least some elasticity. Elasticity is the capability of an object to deform when subject to force, and to recover its original shape after the deforming force ceases to be exerted. Thus, when the backing plate 110 applies pressure to the elastic roller 108 as the elastic roller 108 rolls across the metal sheet 106, the elastic roller 108 is sufficiently elastic to deform over bumps or depressions in the backing plate 110, the substrate 104, and/or the stage 102, in accordance with embodiments. Deformation of the elastic roller 108 can allow for redistribution of pressure along the length of the elastic roller 108. After pressure on the elastic roller 108 from the backing plate 110 is removed, the elastic roller returns to its original form, according to embodiments. In contrast, systems employing non-elastic rollers may result in the pressure being concentrated at high spots on the work piece or roller, resulting in non-uniform bonding. Therefore, the elasticity of the elastic roller 108 enables substantially uniform pressure to be applied across the metal sheet 106, according to embodiments.

According to embodiments, in addition to being elastic, the elastic roller 108 is made, at least in part, from a high temperature material. A "high temperature material" is a material that is suitable for use in high temperature processing. Materials that are suitable for use in high temperature processing are typically resistant to structural degradation over time when exposed to high temperatures. For example, high temperature materials may have no significant change in elasticity or other properties when exposed to high temperatures, and have may have a low rate of fracture and creep accumulation (e.g., a low rate of inelastic deformation). Processing at high temperatures may involve heating an object to temperatures in a range of above 330° C. For example, in some embodiments, high temperature processing involves heating an object to a temperature in a range of 350-550° C. Elastic rollers used in other systems are typically not suitable for use in high temperature processing. For example, some other systems employ elastomer rollers made from silicone, rubber, or urethane. High temperatures (such as temperatures greater than or equal to 350° C.), are beyond the working limit of elastomer materials used in some other systems. For example, the highest temperature elastomers used in some other systems are perfluoroelastomers, which have a maximum temperature of 327° C.

In contrast, embodiments include elastic rollers made from high temperature materials, such as metals that are suitable for high temperature processing. In one embodiment, the elastic roller 108 is a hollow metal roller, such as a thin-walled steel roller (e.g., grade 316 stainless steel or another suitable grade of steel). According to embodiments, a thin-walled steel roller has a sufficient degree of elasticity in the radial direction and is compatible with high processing temperatures.

Figure 1B:
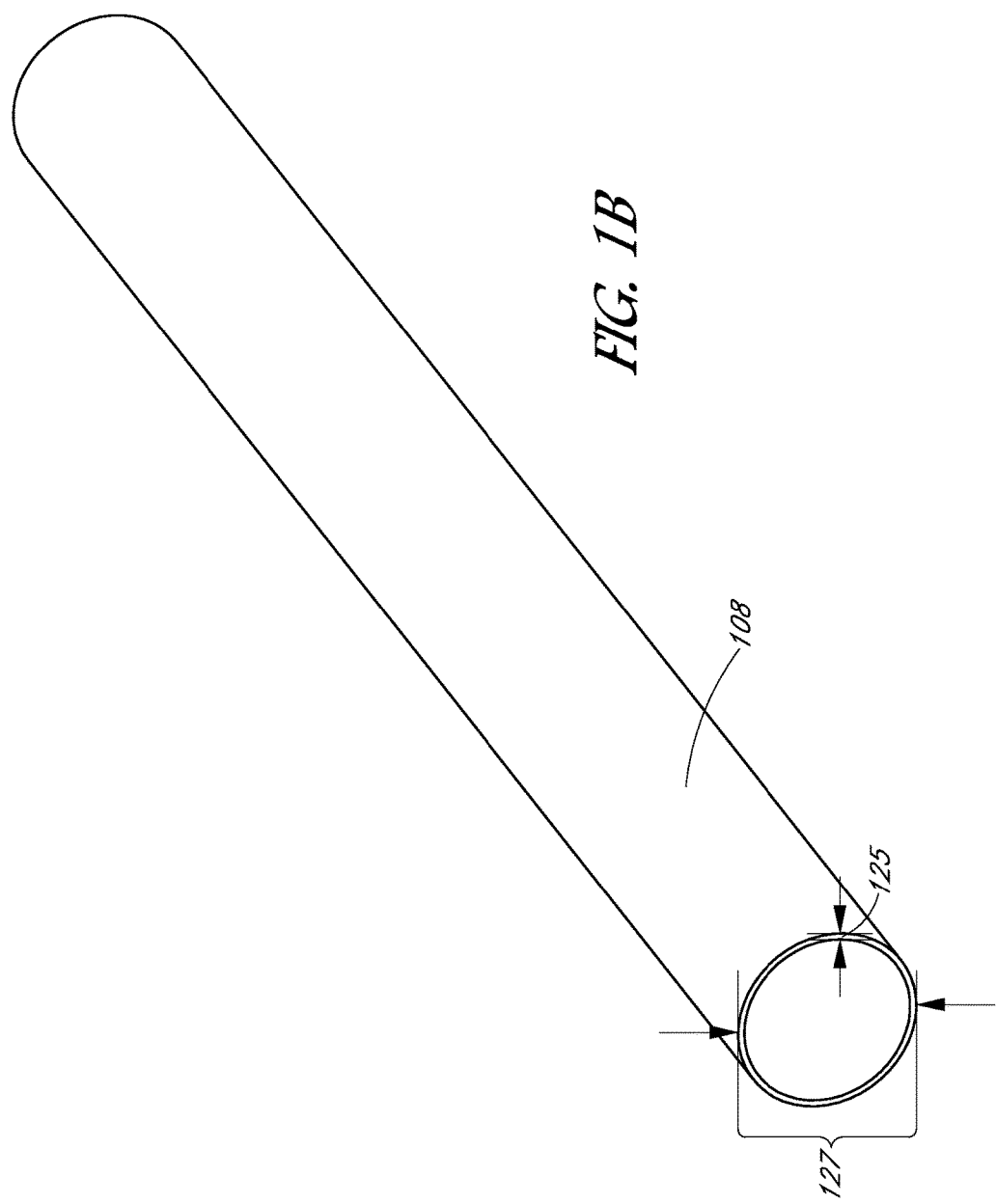
FIG. 1B illustrates an isometric view of an elastic roller, such as the elastic roller 108 of FIG. 1, in accordance with an embodiment of the present disclosure.

FIG. 1B illustrates an isometric view of an elastic roller, such as the elastic roller 108 of FIG. 1, in accordance with an embodiment of the present disclosure. According to one embodiment, the elastic roller 108 has an outer diameter 127 in a range of 4 mm to 25 mm, and a wall thickness 125 of 0.1 mm to 2 mm. However, embodiments enable a range of roller diameters. Embodiments may also include other roller wall thicknesses that provide sufficient elasticity.

In one embodiment, the elastic roller 108 is a metal tube with an inert gas (e.g., argon or helium) inside the tube. In another embodiment, the elastic roller 108 is a metal tube with a helical spring positioned length wise inside the metal tube. According to embodiments, an inert gas or a spring inside the tube of the elastic roller 108 may result in additional force acting radially from the inside of the tube. Therefore, according to embodiments, an inert gas or spring may enable larger elastic forces to be realized with tubes having thinner walls (e.g., larger elastic forces than when using a hollow tube without a spring or inert gas inside). According to embodiments, a tube having a thinner wall may be beneficial because it can have more compliance along the length of the roller when passing over bumps and depressions, however as the wall gets thinner, the tube may deform more under the applied pressure. Therefore, according to embodiments, the deformation of the elastic roller 108 is below the plastic deformation limit to prevent permanent denting of the elastic roller 108.

In one embodiment, the backing plate 110 is pivotable such that when the backing plate 110 applies pressure to the elastic roller 108, the backing plate 110 pivots about a line that is substantially perpendicular to the elastic roller 108. For example, as illustrated in FIG. 1A, in one embodiment, the backing plate 110 pivots around the z-axis such that the backing plate 110 can self-align parallel to the x-axis of the substrate 104. In one embodiment, the backing plate 110 pivots about an axle 112. In one such embodiment, the backing plate 110 is self-pivotable or self-aligning, such that it pivots automatically (without being actively controlled by a user or controller) to enable uniform pressure during bonding. Therefore, in accordance with embodiments, the surface of the substrate 104 along the z-axis does not need to be exactly parallel to the surface of the backing plate 110 along the z-axis to achieve uniform bonding, because the elastic roller 108 only makes line contact perpendicular to the z-axis.

As illustrated in FIG. 1A, the system further includes lift rails 130 to move the stage 102 vertically (along the y-axis as illustrated in FIG. 1A), to bring the roller 108 into contact with both the metal sheet 106 over the substrate 104 and the backing plate 110, in accordance with embodiments. The lift rails 130 may be coupled to a lift cam 126, which may be operated with a lift crank 124. Although in FIG. 1A the lift rails are located below the stage 102 to vertically translate the stage 102, lift rails may also, or alternatively, be coupled with the upper frame 114 to vertically translate the backing plate 110. Thus, lift rails may be included to move the stage 102 towards the roller 108, and/or to move the roller 108 towards the stage 102. FIG. 1A also illustrates slide rails 128 along which the stage 102 may be moved horizontally (along the z-axis as illustrated) under the roller 108, in accordance with an embodiment. For example, the stage 102 may be supported over a slide table 122 that couples with and slides horizontally along the slide rails 128. In addition to, or in place of, slide rails to move the stage 102, the system may include slide rails to move the backing plate 110 horizontally across the stage 102. Thus, slide rails coupled with the stage 102 and/or the backing plate 110 enable the back plate 110 to roll the roller 108 across the metal sheet 106 as the backing plate 110 applies pressure to the roller 108, in accordance with embodiments.

In one embodiment, the system includes a pressure sensor (e.g., a weight scale, load cell, or other pressure sensor) to detect the pressure applied by the backing plate, and therefore by the roller 108 to the metal sheet 106 over the substrate 104. For example, as illustrated in FIG. 1A, a pressure sensor 118 may be located under the stage 102. A pressure sensor could also be located at other points under the substrate 104 or above the heated backing plate 110. Readings 120 from the pressure sensor 118 may then be sent to a controller or other computing device, and may be used in a feedback loop to adjust the vertical position of the upper frame 114 and/or the stage 102. A controller or other computing device may include some or all of the elements described below with respect to the data processing system 600 of FIG. 6.

Thus, according to embodiments, an elastic roller and backing plate that is heated and/or pivoting enables a uniform pressure to be applied to the foil, even when there are wafer thickness variations or non-planar stage or backing plate surfaces. Using a backing plate instead of a backup roller can alleviate the need to rigidly constrain the work roller, thus enabling more freedom in work roller dimensions, in accordance with embodiments.

Figure 2:
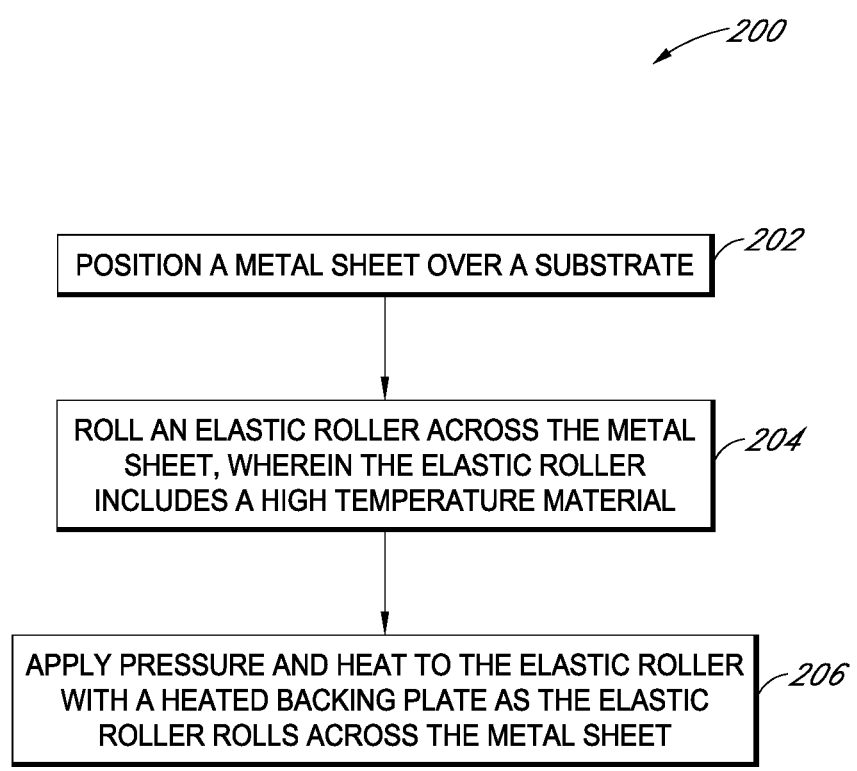
FIG. 2 is a flowchart listing operations in a method of bonding a metal sheet to a substrate, in accordance with an embodiment of the present disclosure.

FIG. 2 is a flowchart 200 listing operations in a method of bonding a metal sheet to a substrate, in accordance with an embodiment of the present disclosure. FIGS. 3A, 3B, 4A, 4B, and 5A-5G illustrate different views of systems for bonding a metal sheet to a substrate according to different embodiments, at different points in the method of FIG. 2.

Figure 3A:
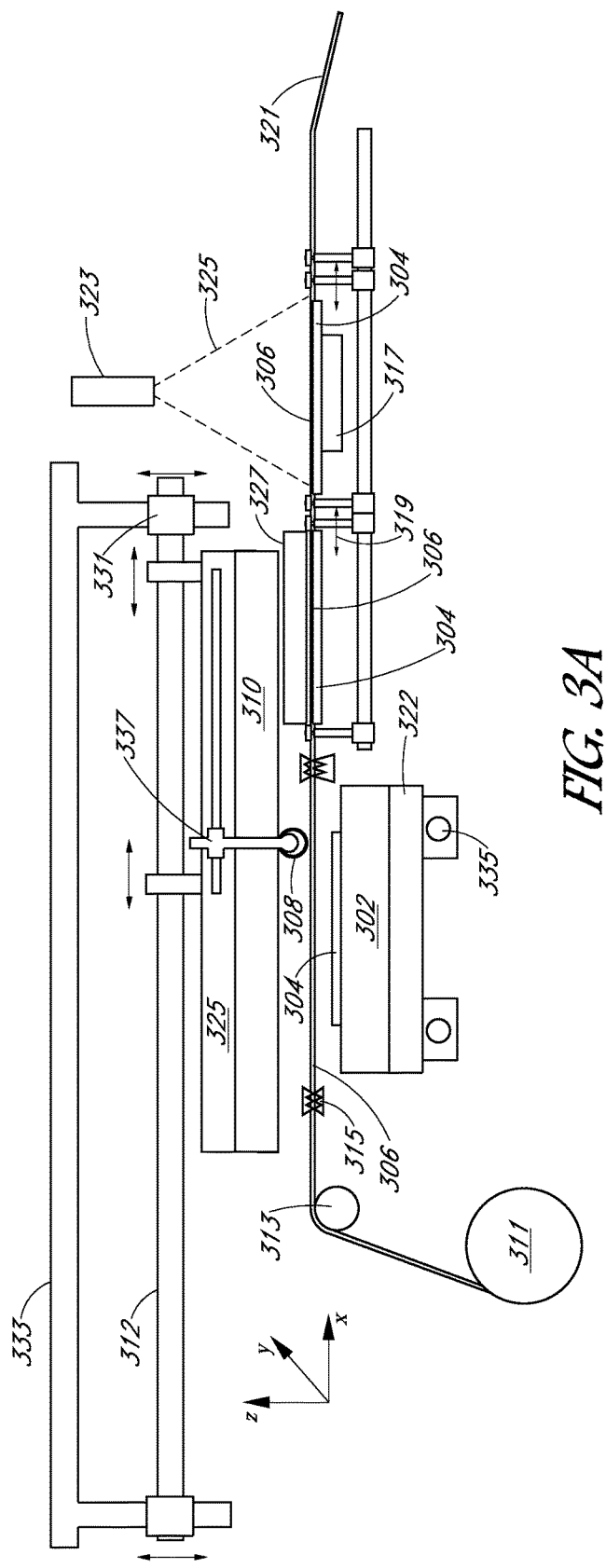
FIGS. 3A and 3B illustrate cross-sectional views of a system for bonding a metal sheet to a substrate using a continuous roll of foil, at different points in the method of FIG. 2, in accordance with an embodiment of the present disclosure.
Figure 3B:
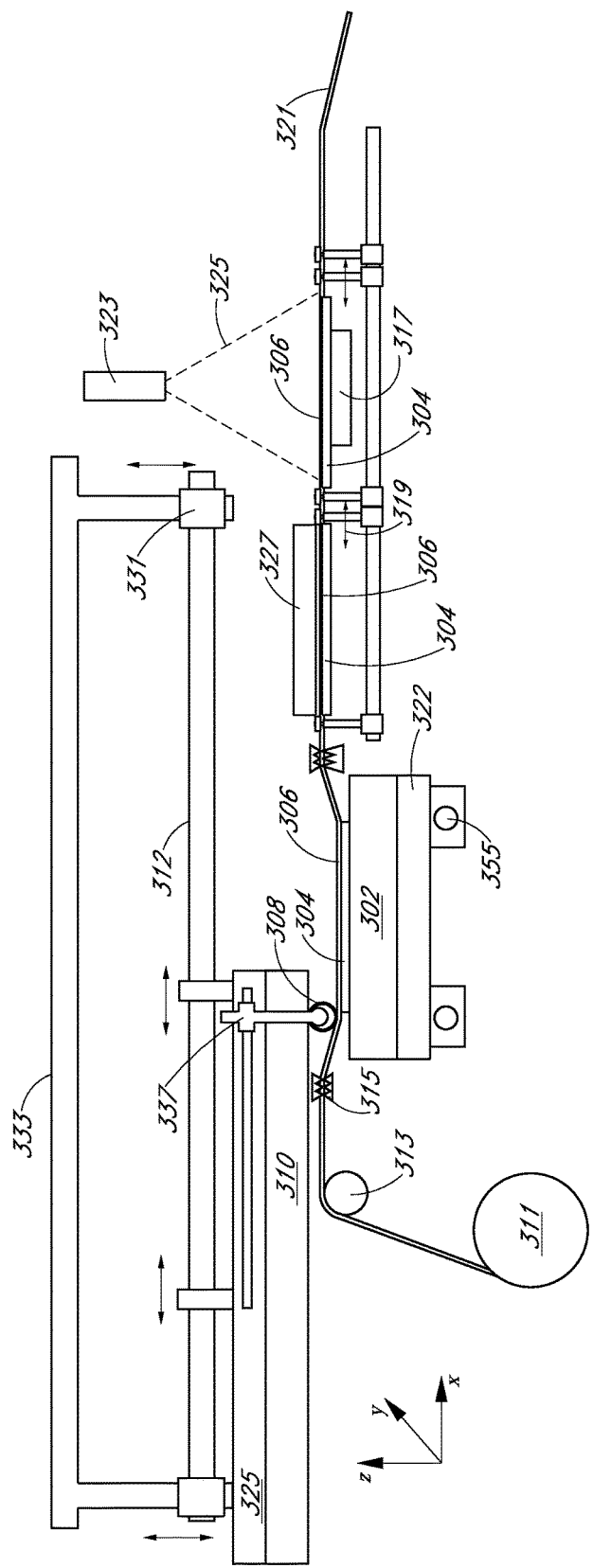
Figure 4A:
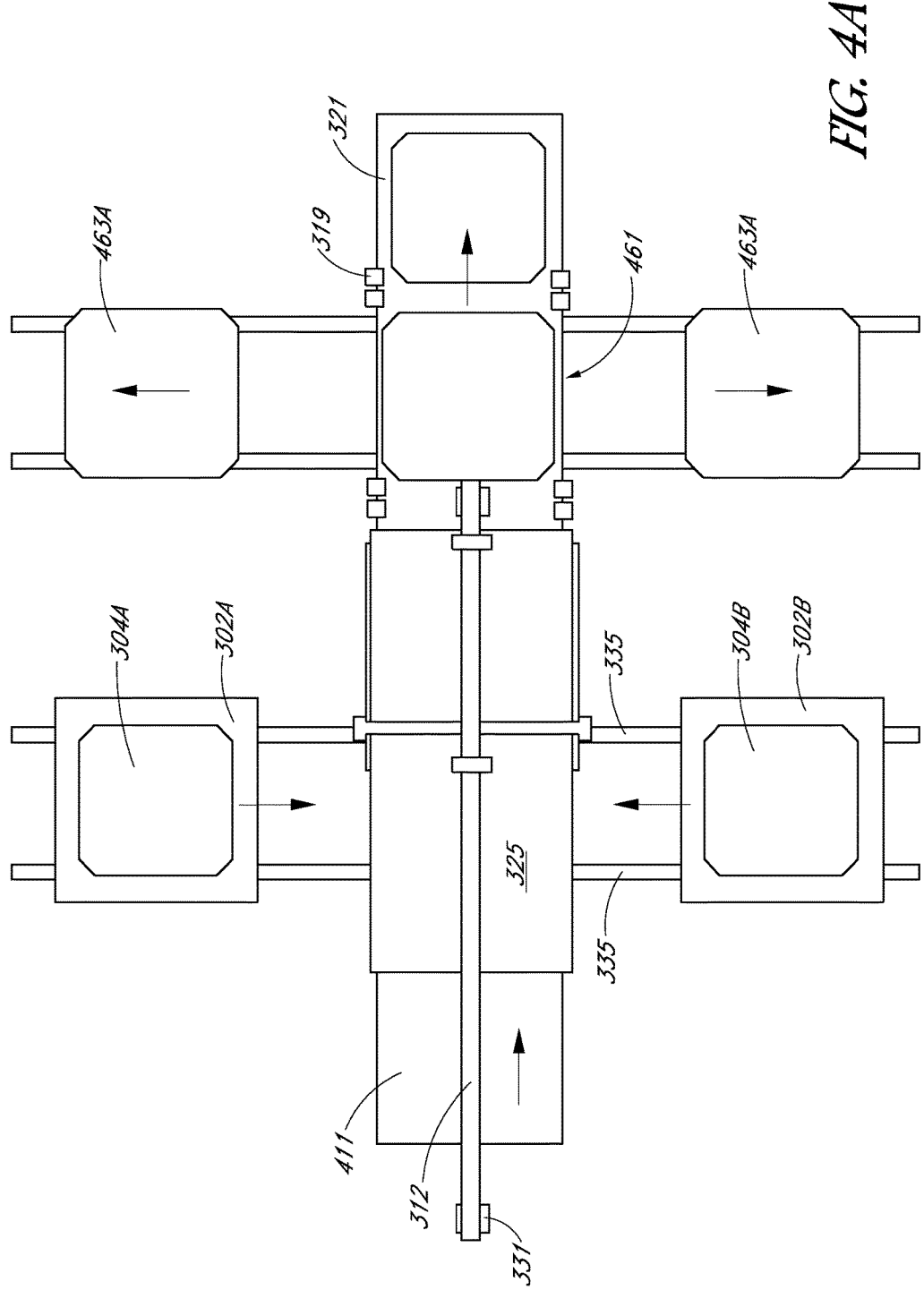

Turning to FIG. 2, a method of bonding a metal sheet to a substrate includes positioning the metal sheet over the substrate, at operation 202, in accordance with embodiments. According to embodiments, the metal sheet could be a metal sheet from a continuous roll of foil, or a discrete metal sheet (e.g., a cut section of foil). For example, referring to FIG. 3A, in one embodiment, a metal sheet 306 from a roll 311 of foil is stretched out over the substrate 304. In an embodiment, and as illustrated in FIG. 3A, the foil from the foil roll 311 unrolls from left to right (e.g., in the positive x direction), and may be routed over the substrate 304 via one or more rollers 313. Foil grippers (e.g., foil tensioners) 315 can hold the metal sheet 306 over the substrate 304 prior to bonding. The foil grippers 315 may be used to pull the metal sheet 306 out near the edges of the substrate 304 (e.g., near four edges of a substantially square substrate). FIGS. 4A and 4B, which illustrate top-down views of the system of FIGS. 3A and 3B, more clearly illustrate the foil grippers 315. For example, FIG. 4B, which shows a top down view of the system of FIG. 3A with the backup plate removed, illustrates four foil grippers 315 applying tensile stress along the plane of the foil (e.g., pulling) the metal sheet 306, in accordance with embodiments. The tensile stress from the foil grippers 315 can minimize wrinkles in the metal sheet 306, and makes the metal sheet substantially flat prior to bonding. Thus, according to one embodiment, positioning the metal sheet over the substrate involves holding the metal sheet 306 over the substrate 304 with foil grippers 315 while the foil grippers 315 apply tensile stress to the foil to straighten out or smooth the metal sheet 306.

Figure 5A:
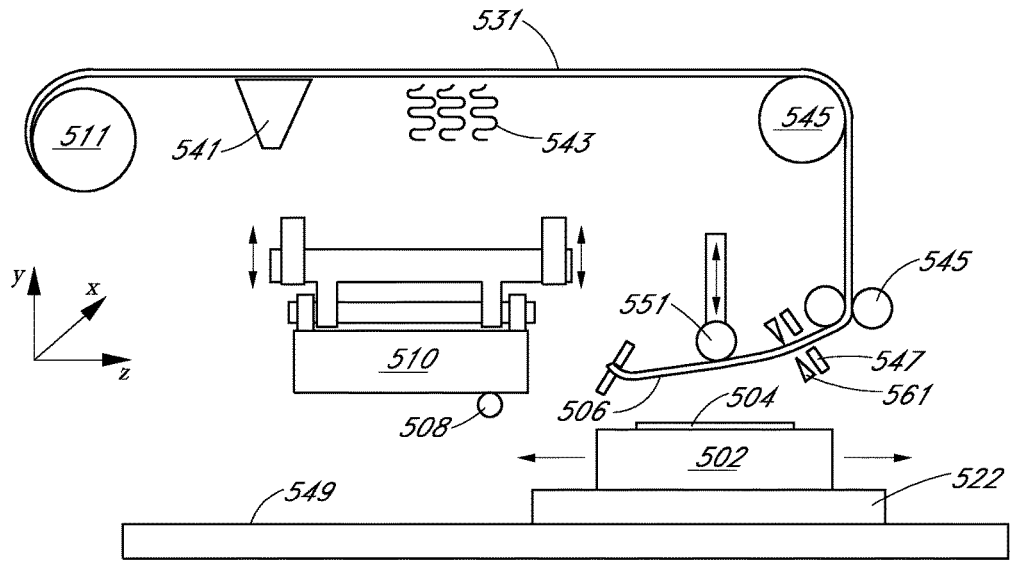
FIGS. 5A, 5B, 5C, 5D, 5E, 5F, and 5G illustrate cross-sectional views of a system for bonding a metal sheet to a substrate using non-continuous sheets of foil, at different points in the method of FIG. 2, in accordance with an embodiment of the present disclosure.

FIG. 5A illustrates an example of positioning discrete sheets of foil (rather than a continuous foil such as in FIG. 3A) over a substrate, in accordance with an embodiment of the present disclosure. According to an embodiment, the discrete sheets of foil may be cut in such a way that enables the central, bonded area of the foil to be tensioned as it expands from localized heating, while not being constrained by sections of foil that are not heated as much. To achieve this, in one embodiment, sections from the edges of the sheets of foil (e.g., sections from the edges of square or rectangular sheets of foil) may be removed so that the cooler edges do not form a continuous foil region between tensioning points, which may prevent tension from acting across the center of the foil.

Similarly as in FIG. 3A, the metal sheet 506 can be dispensed from a roll of foil 511 (e.g., via a foil dispenser). However, other embodiments may use another method of providing metal sheets. In one embodiment, as the foil is unrolled, a surface is of the foil is coated with a non-stick coating. As illustrated in FIG. 5A, a non-stick coating applicator (such as a sprayer) 541 coats the back side of the metal sheet 506 with the non-stick coating, such as graphite, in accordance with an embodiment. As is explained below, in one embodiment, the back side of the metal sheet 506 is to come in contact with a tack roller 551 and the elastic roller 508, and the non-stick coating can help prevent the metal sheet 506 from sticking to the tack roller 551 and/or the elastic roller 508. In one embodiment, a non-stick coating could be applied to the tack roller 551 and/or the elastic roller 508 instead of, or in addition to, coating the back side of the metal sheet 506. For example, in one embodiment the tack roller 551 and/or the elastic roller 508 are coated with titanium aluminum nitride (TiAlN, diamond-like carbon, a diamond-like alloy, or other coating that can prevent the metal sheets from adhering to the elastic roller 508 or tack roller 551).

Figure 5B:
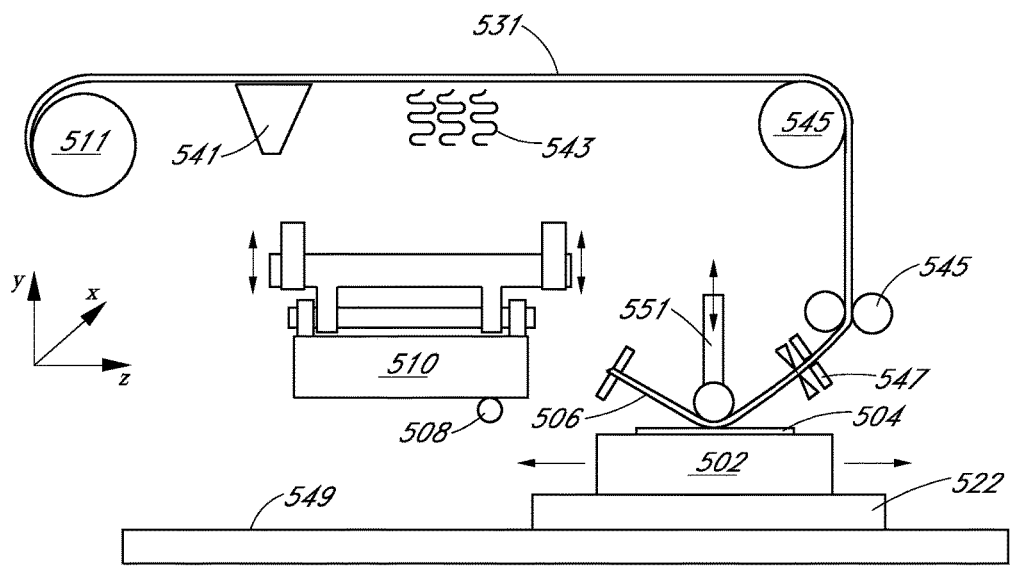
Figure 5C:
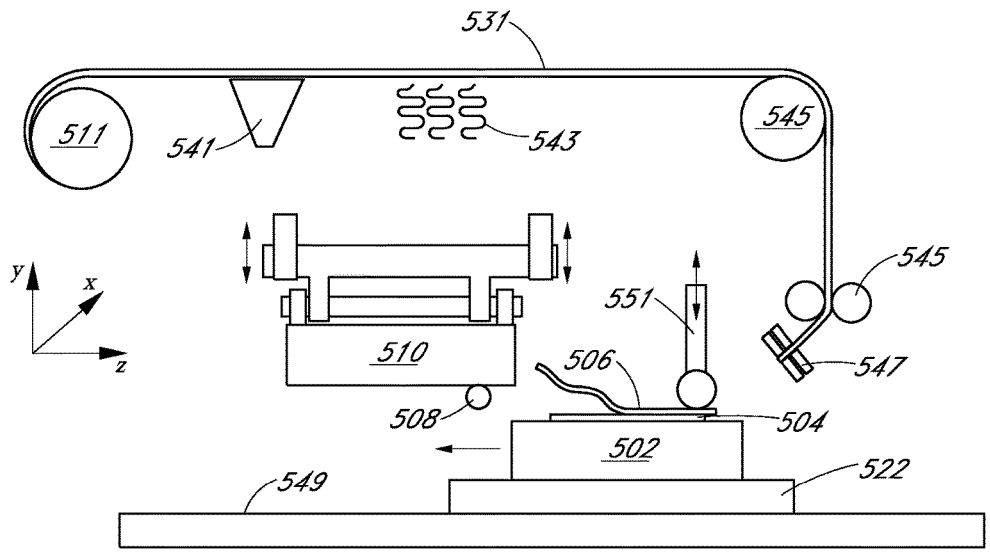
Figure 5D:
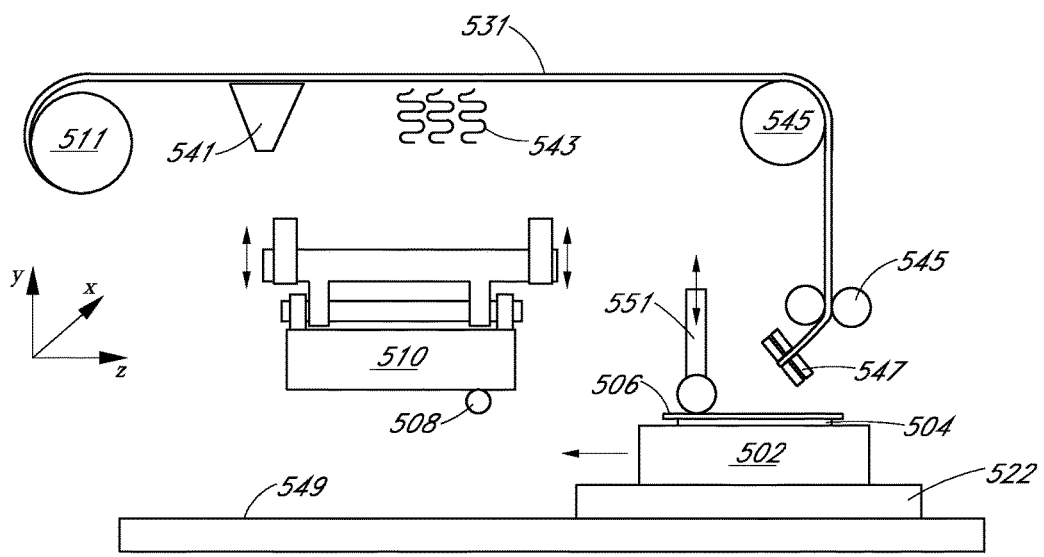

After coating the metal sheet 506 with a non-stick coating, the metal sheet may be heated with heating elements 543. Pre-heating the metal sheet may facilitate placement and bonding of the metal sheet 506 over the substrate 504. In an embodiment where the metal sheet 506 is dispensed from a foil roll 511, such as in FIG. 5A, the metal sheet may be routed to the area above the substrate 504 via one or more rollers 545. The metal sheet 506 may be held between foil grippers 547. The metal sheet 506 is then tacked (e.g., removably attached, but not yet bonded) to the substrate 504 with a tack roller 551, in accordance with an embodiment, and as illustrated in FIGS. 5B-5D. In FIG. 5B, the tack roller 551 is moved down to press the metal sheet 506 onto the surface of the substrate 504, in accordance with embodiments. In one embodiment, after lowering the tack roller 551 down to apply pressure to the metal sheet 506, holding the metal sheet 506 into place over the substrate 504, the metal sheet 506 is cut by a foil cutter 561, as illustrated in FIG. 5C.

In one embodiment, the foil cutter 561 cuts a metal sheet having dimensions slightly larger than the substrate 504, such that there is excess foil beyond the edges of the substrate 504. Cutting the metal sheet 506 such that there is excess foil beyond the edges of the substrate 504 can provide for a margin of error in the event that the metal sheet 506 shifts relative to the substrate 504 prior to tacking and/or bonding. In another embodiment, the metal sheet may be cut slightly smaller than the substrate 504 and aligned to the center of the substrate 504 during bonding such that after bonding the metal sheet to the substrate 504, the edges of the substrate 504 are not covered by the metal sheet (e.g., the edges are visible). Having visible edges can be advantageous for subsequent processing (e.g., patterning processes) that may involve alignment of the substrate and/or equipment. For example, patterning processes may involve alignment by finding the edges of the substrate 504. Therefore, in one embodiment, optical edge detection of the edges of the substrate 504 may be simpler when the edges of the substrate 504 are not obscured by overhanging foil.

The stage 502 is then moved horizontally (along the z-axis as illustrated in FIGS. 5C and 5D) while the tack roller 551 applies downward pressure on the metal sheet 506, in accordance with embodiments, and as illustrated in FIGS. 5C and 5D. The horizontal movement of the stage 502 while the tack roller 551 is applying downward pressure causes the metal sheet 506 to become tacked to the substrate, in accordance with embodiments. In other embodiments, the tack roller 551 may move horizontally to tack the metal sheet 506 to the substrate 504. After tacking, the tack roller 551 can be lifted from the metal sheet 506. Thus, in one embodiment, positioning the metal sheet 506 over the substrate 504 involves tacking the metal sheet 506 into place with a tack roller 551 and cutting the metal sheet 506 prior to bonding.

Turning again to FIG. 2, the method also includes rolling an elastic roller across the metal sheet, at operation 204, in accordance with embodiments. The elastic roller may be the same or similar to the elastic roller 108 described above with reference to FIG. 1A. Thus, according to embodiments, the elastic roller is made at least in part from a high temperature material, as explained above. In one example, referring to FIG. 3B, rolling the elastic roller 308 across the metal sheet may involve rolling a hollow metal roller across the metal sheet 306. As mentioned above, the elastic roller 308 may also contain an inert gas, and/or house a spring disposed lengthwise inside the elastic roller. In one embodiment, and as illustrated in FIG. 3B, the elastic roller 308 moves from right to left (e.g., in the negative x direction). According to embodiments, the rolling of the elastic roller 308 is caused by the horizontal motion (motion along the x-axis, as shown in FIG. 3B) of the backing plate 310, while the stage 302 remains in place during the rolling. The range of motion of the roller 308 may be limited along the x-axis by a roller retaining slide 337.

Figure 5E:
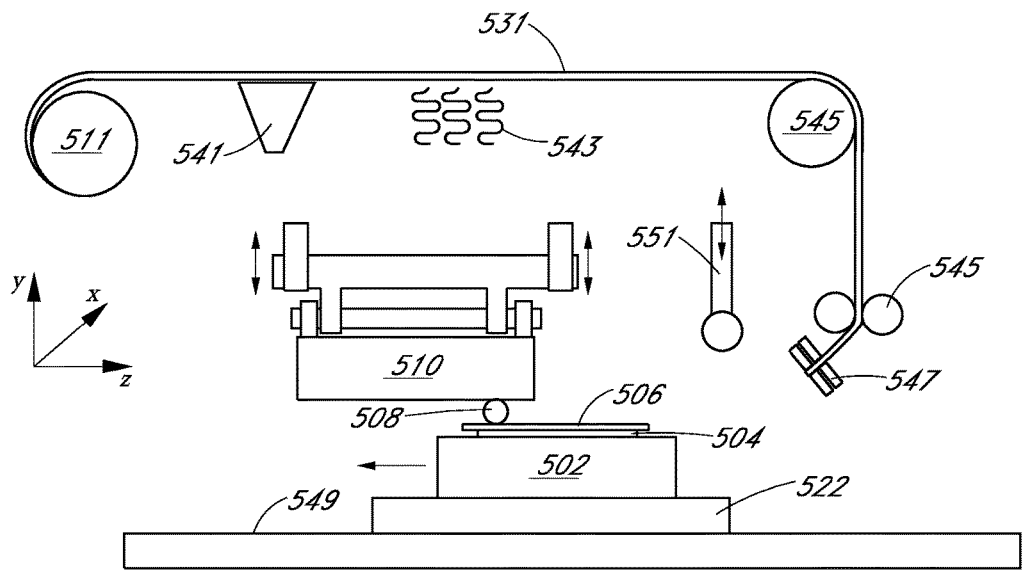
Figure 5F:
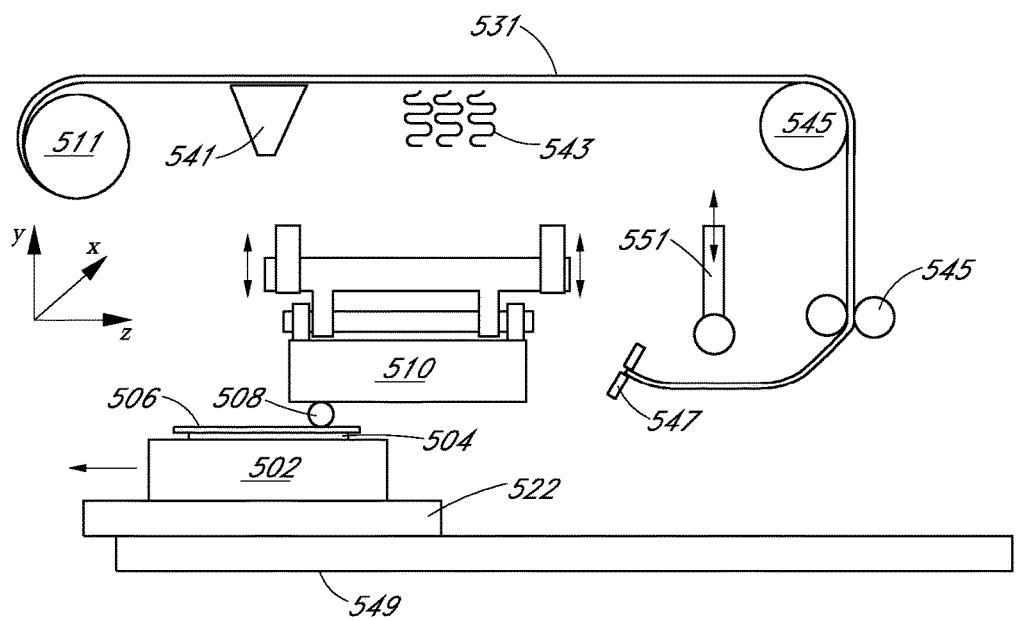
Figure 5G:
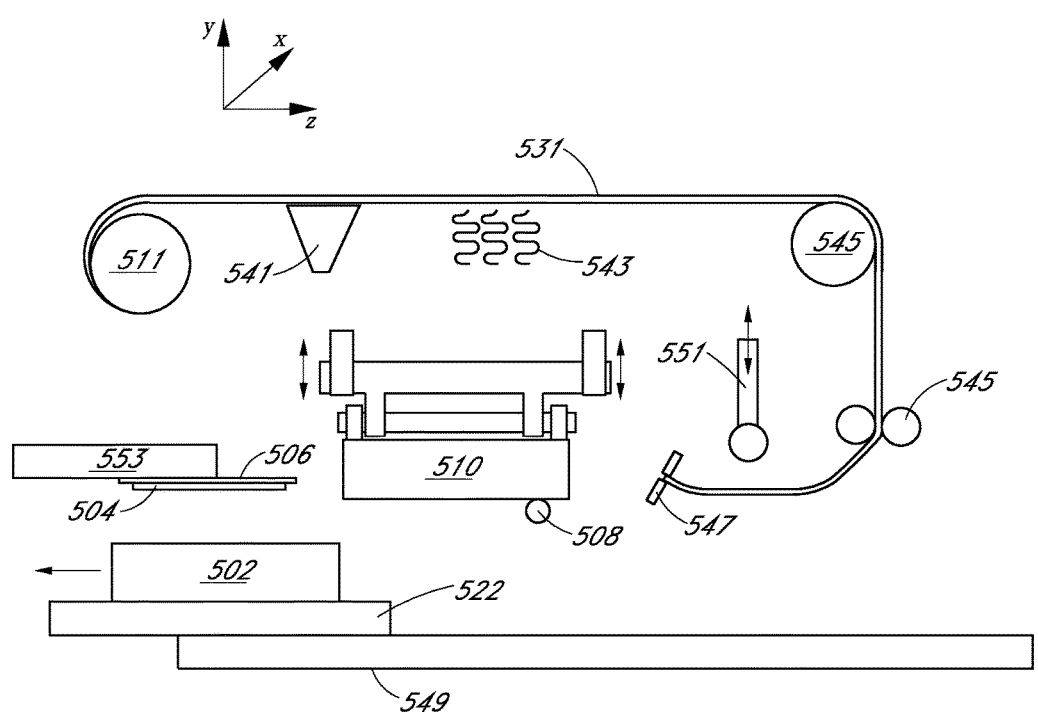

In one embodiment, such as illustrated in FIG. 3B, the foil roll 311 and the stage 302 do not move along the x-axis relative to each other. However, as illustrated in FIG. 1A, the rolling of the elastic roller 108 may also be achieved by movement of the stage 102. Similarly, FIGS. 5E and 5F illustrate rolling an elastic roller 508 across the metal sheet 506 due to movement of the stage 502 via horizontal movement of the slide table 522, in accordance with another embodiment. For example, the stage 502 is supported over the slide table 522, and the slide table 522 moves along the slide rails 549 in the z-direction, as illustrated in FIGS. 5E and 5F, in accordance with embodiments. Movement of the stage 502 therefore results in the elastic roller 508 rolling over the metal sheet 506, in accordance with embodiments.

Referring to FIG. 2, the method further includes applying pressure and/or heat to the elastic roller with a backing plate located over the roller as the elastic roller rolls across the metal sheet, at operation 206. For example, FIG. 3B illustrates the backing plate 310 applying pressure to the roller 308 down along the z-axis, pressing the roller 308 against the metal sheet 306. The stage 302 and/or the backing plate 310 may be moved vertically to create sufficient pressure between the roller 308 and the metal sheet 306 to bond the metal sheet 306 to the substrate 304. As mentioned above, the backing plate 310 may also be heated.

As illustrated in FIG. 3B, the backing plate 310 is coupled with an upper plate 325, and the upper plate 325 is coupled with a slide shaft or axle 312, along which the upper plate 325 (and therefore the backing plate 310) can move. The slide shaft 312 may also move vertically (along the z-axis as illustrated in FIG. 3A) relative to an upper frame 333 via linear bearings 331, according to embodiments. Vertical movement of the slide shaft 312 allows the backing plate 310 to be lowered to press the elastic roller 308 into the metal sheet 306. Thus, the vertical position (e.g., height) of the backing plate may determine the pressure exerted on the elastic roller 308, and therefore on the metal sheet 306 and substrate 304.

In an embodiment with an upper plate 325, the backing plate 310 can be heated, while the upper plate 325 is not actively heated. Other embodiments may not include a separate upper plate. In one embodiment, while pressure is being applied from the backing plate 310, heat from the heated backing plate 310 is transferred to the elastic roller 308, and from the elastic roller 308 to the metal sheet 306. The stage 302 may also, or alternatively be heated. In one embodiment in which the stage 302 is heated, a lower portion 322 that couples with slide rails 335 may not be heated. Thus, the heat and pressure from the backing plate 310 and/or the heat from the stage 302 enable a bond to form between the metal sheet 306 and the substrate 304. Also as mentioned above, applying pressure with the backing plate may further involves applying pressure with a pivotable backing plate that is self-pivotable about a line substantially perpendicular to the roller 308.

Similarly, FIGS. 5E and 5F illustrate the backing plate 510 applying pressure to the roller 508 via vertical movement of the backing plate 510 (e.g., via a slide shaft or frame with which the backing plate 510 is coupled), in accordance with embodiments. Although both FIGS. 3B and 5E illustrate examples in which the backing plate is moved vertically to cause pressure to be applied between the elastic roller and the metal sheet, in other embodiments, the stage may be moved vertically to cause pressure to be applied.

After bonding the metal sheet to the substrate, further processing operations may be performed. For example, in an embodiment using a continuous foil, the substrate may be cut from the continuous foil. Referring again to FIG. 3B, the substrate 304 may be moved from the stage 302 to another stage for cutting. In an embodiment in which the system bonds the metal sheet 306 to the substrate 304 while the metal sheet 306 is a part of a continuous roll of foil, a foil edge gripper 319 or foil edge roller can be used to pull the edge of the metal sheet 306 after bonding, causing the substrate 304 to be unloaded from the stage 302. Pulling on the edges of the foil to remove the substrate 304 from the stage 302 also unrolls more foil from the foil roller 311 for the next substrate to be processed, in accordance with embodiments. For example, FIG. 3B illustrates the substrate 304 as being pulled from the stage 302 and supported by a substrate gripper 317 to hold the substrate 304 in place while the metal sheet 306 is cut. In the embodiment illustrated in FIG. 3B, the system also includes a heat shield 327, which can protect and/or enable cooling of the substrate 304 after bonding from further heat exposure from a heated backing plate. In one embodiment, the substrate 304 may be further processed on the same stage 302.

The metal sheet 306 may be cut by a cutter (e.g., a foil trimmer). As illustrated in FIG. 3B, in one embodiment, the cutter is a laser 323 capable of cutting the metal sheet 306 around the edges of the substrate 304 to separate the substrate 304 from the continuous foil. In the embodiment illustrated in FIG. 5G, the metal sheet 506 was already cut prior to bonding. Therefore, after bonding, the substrate 504 can be directly unloaded from the system (e.g., via a robotic unload arm 553). After the metal layer has been bonded to the substrate and trimmed, the substrate may be subject to further processing, including inclusion in a solar module.

FIGS. 4A and 4B, which illustrate top-down views of the system of FIGS. 3A and 3B, show how substrates can be loaded and unloaded from multiple sides to increase processing speed, in accordance with embodiments. FIG. 4A illustrates a top-down view of the system of FIGS. 3A and 3B when the backing plate 310 is in place over the substrate 304, in accordance with an embodiment. FIG. 4B illustrates a top-down view with the backing plate 310 removed, in accordance with an embodiment. In the embodiment illustrated in FIGS. 4A and 4B, multiple stages 302A and 302B with pre-loaded substrates 304A and 304B, respectively, can enable fast processing. For example, a first stage 302A supporting a first substrate 304A can be moved under the backing plate (and therefore under the upper plate 325, as shown in FIG. 4A) via the slide rails 335.

According to one embodiment, and as illustrated in FIGS. 4A and 4B, the foil 411 is unrolled from the foil roll from left to right. While a metal sheet is being bonded to the first substrate 304A, a second substrate 304B may be pre-loaded over a second stage 302B on the opposite side of the system. The pre-loaded second substrate 304B is ready to be moved under the backing plate after the first substrate 304A is unloaded from the stage 302A, and after the stage 302A moves back to its loading position, in accordance with an embodiment. The second substrate 304B may also be pre-heated (e.g., in an embodiment with a heated stage) while the first substrate 304A is being processed.

In one embodiment, after a substrate is unloaded from the stage, the substrate is transported (e.g., via pulling the foil 411 to the right) to a position 461, where a laser cuts the substrate out of the foil. Other embodiments may involve other cutting mechanisms, such as a mechanical cutter, to cut the substrate out of the foil. Processed substrates 463A and 463B over which a metal layer has been bonded and cut may then be moved from the position 461 and unloaded from the system, in accordance with embodiments. Remaining foil 321 (e.g., foil scraps remaining after cutting around the edges of the substrate) may be rolled off (or otherwise removed) from the system and may be recycled.

Figure 6:
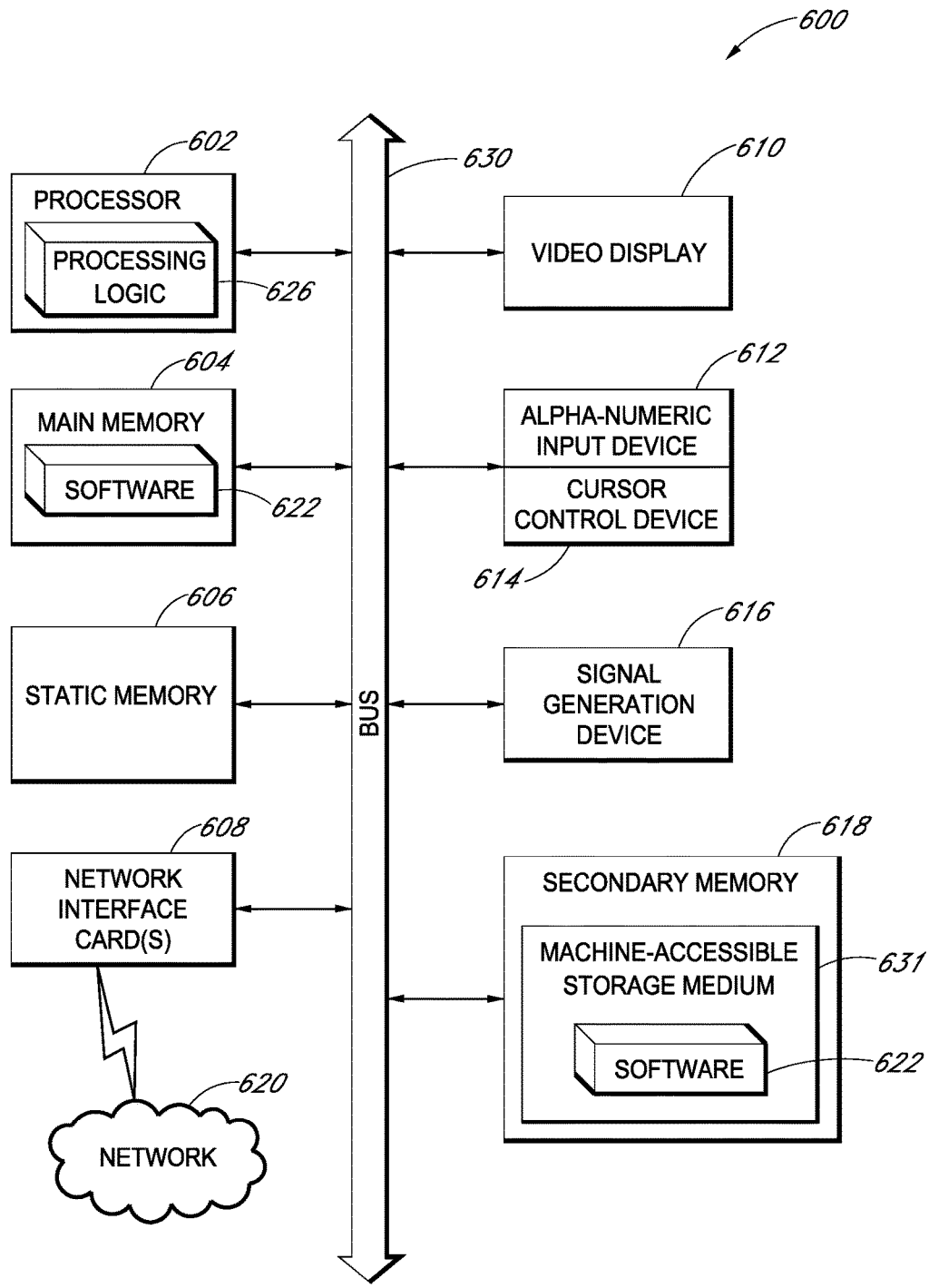
FIG. 6 illustrates a data processing system that may store and execute a set of instructions to perform methods discussed herein, in accordance with an embodiment of the present disclosure.

FIG. 6 illustrates a data processing system (e.g., computer system) that may be configured to store and execute a set of instructions to perform the disclosed techniques, in accordance with an embodiment of the present disclosure. The exemplary data processing system 600 includes one or more processor(s) 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a secondary memory 618 (e.g., a data storage device), which communicate with each other via a bus 630.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, etc. Processor 602 may also be one or more special-purpose processing devices such as an application specific integrated circuit (ASIC), a field programmable gate array (FPGA), a digital signal processor (DSP), network processor, or the like. Processor 602 is configured to execute the processing logic 626 for performing the operations discussed herein.

The data processing system 600 may further include a network interface device 608. The data processing system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The secondary memory 618 may include a machine-accessible storage medium (or more specifically a computer-readable storage medium) 631 on which is stored one or more sets of instructions (e.g., software 622) embodying any one or more of the methodologies or functions described herein. The software 622 may also reside, completely or at least partially, within the main memory 604 and/or within the processor 602 during execution thereof by the data processing system 600, the main memory 604 and the processor 602 also constituting machine-readable storage media. The software 622 may further be transmitted or received over a network 620 via the network interface device 608. While the machine-accessible storage medium 631 is shown in an exemplary embodiment to be a single medium, the term "machine-readable storage medium" should be taken to include a single medium or multiple media (e.g., a centralized or distributed database, and/or associated caches and servers) that store the one or more sets of instructions.

The term "machine-readable storage medium" shall also be taken to include any medium that is capable of storing or encoding a set of instructions for execution by the machine and that cause the machine to perform any one or more of the methodologies of the present disclosure. For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., infrared signals, digital signals, etc.)), etc.

Thus, thermo-compression bonding tools with a high temperature elastic element, and methods of bonding a metal sheet to a substrate have been disclosed.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A system for bonding a metal sheet to a substrate, the system comprising:
    a stage to support the substrate;
    an elastic roller located above the stage, wherein the elastic roller comprises a material that can withstand temperatures at or above 350 degrees Celsius; and
    a heated backing plate located above the elastic roller; wherein the heated backing plate is configured to apply pressure and heat to the elastic roller as the elastic roller rolls across the metal sheet disposed above the substrate.

2. The system of claim 1, wherein the heated backing plate is self-pivotable about a line substantially perpendicular to the elastic roller.

3. The system of claim 1, wherein the elastic roller comprises a hollow metal roller.

4. The system of claim 3, wherein the hollow metal roller comprises a thin-walled stainless steel roller.

5. The system of claim 3, wherein the elastic roller has an outer diameter in a range of 4 mm to 25 mm, and a wall thickness of 0.1 mm to 2 mm.

6. The system of claim 1, wherein the elastic roller comprises a metal tube configured to contain an inert gas inside the metal tube.

7. The system of claim 6, wherein the inert gas comprises argon or helium.

8. The system of claim 1, wherein the heated backing plate comprises one or more heating elements configured to heat the heated backing plate to a temperature in a range of 300 to 550 degrees C.

9. A system for bonding a metal sheet to a substrate, the system comprising:
    a stage to support the substrate;
    an elastic roller located above the stage, wherein the elastic roller comprises a material that can withstand temperatures in the range of 350-550 degrees Celsius; and
    a heated backing plate located above the elastic roller; wherein the heated backing plate is configured to apply pressure and heat to the elastic roller as the elastic roller rolls across the metal sheet disposed above the substrate.

10. The system of claim 9, wherein the heated backing plate is self-pivotable about a line substantially perpendicular to the elastic roller.

11. The system of claim 9, wherein the elastic roller comprises a hollow metal roller.

12. The system of claim 11, wherein the hollow metal roller comprises a thin-walled stainless steel roller.

13. The system of claim 11, wherein the elastic roller has an outer diameter in a range of 4 mm to 25 mm, and a wall thickness of 0.1 mm to 2 mm.

14. The system of claim 9, wherein the elastic roller comprises a metal tube configured to contain an inert gas inside the metal tube.

15. The system of claim 14, wherein the inert gas comprises argon or helium.

16. The system of claim 9, wherein the heated backing plate comprises one or more heating elements configured to heat the heated backing plate to a temperature in a range of 300 to 550 degrees C.

* * * * *